(12) United States Patent
Lesur et al.

(10) Patent No.: US 12,627,125 B2
(45) Date of Patent: May 12, 2026

(54) FLEXIBLE, ARC RESISTANT, FLUID REPELLANT, HIGH TEMPERATURE AND ABRASION RESISTANT, CIRCUMFERENTIALLY CONTINUOUS, SEAMLESS TEXTILE SLEEVE AND METHOD OF CONSTRUCTION THEREOF

(71) Applicant: Systems Protection Group US LLC, Northville, MI (US)

(72) Inventors: Thibaut Lesur, Clairoix (FR); Amelie Simoens, Compiegne (FR); Tianqi Gao, Malvern, PA (US); Kamel Fennell, Plymouth Meeting, PA (US); Alexis Zambino Mason, Flagstaff, AZ (US); Xiaodan Qiu, Phoenixville, PA (US)

(73) Assignee: Systems Protection Group US LLC, Northville, MI (US)

( * ) Notice: Subject to any disclaimer, the term of this patent is extended or adjusted under 35 U.S.C. 154(b) by 269 days.

(21) Appl. No.: 18/118,506

(22) Filed: Mar. 7, 2023

(65) Prior Publication Data

US 2024/0305075 A1 Sep. 12, 2024

(51) Int. Cl.
| | |
|---|---|
| *H02G 3/04* | (2006.01) |
| *D03D 1/00* | (2006.01) |
| *D03D 3/02* | (2006.01) |
| *D03D 15/283* | (2021.01) |
| *D03D 15/513* | (2021.01) |
| *D06N 3/00* | (2006.01) |
| *D06N 3/12* | (2006.01) |

(52) U.S. Cl.
CPC ......... *H02G 3/0406* (2013.01); *D03D 1/0043* (2021.05); *D03D 3/02* (2013.01); *D03D 15/283* (2021.01); *D03D 15/513* (2021.01);

*D06N 3/0006* (2013.01); *D06N 3/0056* (2013.01); *D06N 3/128* (2013.01); *D06N 2201/0272* (2013.01); *D06N 2203/066* (2013.01); *D06N 2209/067* (2013.01); *D06N 2209/128* (2013.01); *D10B 2331/021* (2013.01); *D10B 2331/061* (2013.01); *D10B 2505/00* (2013.01)

(58) Field of Classification Search
CPC ...... H02G 3/04; D03D 15/513; D03D 15/283; D03D 1/0043; D03D 3/02
USPC .......................................................... 174/135
See application file for complete search history.

(56) References Cited

U.S. PATENT DOCUMENTS

| | | | | |
|---|---|---|---|---|
| 4,539,082 A | * | 9/1985 | Klotz | ..................... C25B 13/00 |
| | | | | 204/295 |
| 2010/0108171 A1 | | 5/2010 | Relats Manent | |
| 2019/0382951 A1 | * | 12/2019 | Lesur | ................... F16L 11/088 |

(Continued)

FOREIGN PATENT DOCUMENTS

| | | | |
|---|---|---|---|
| WO | 2008119844 A1 | 10/2008 | |

*Primary Examiner* — Tremesha W Burns
(74) *Attorney, Agent, or Firm* — John D. Wright; Dickinson Wright PLLC

(57) ABSTRACT

A textile sleeve having a seamless, circumferentially continuous wall including a textile layer formed of yarns interlaced with one another. The textile layer having an outer surface and an opposite inner surface bounding an enclosed cavity extending lengthwise along a central longitudinal axis between opposite open ends. At least some of the yarns include multifilaments resistant to heat and monofilaments resistant to heat, and a silicone-based coating adhered to the outer surface.

14 Claims, 3 Drawing Sheets

(56) References Cited

U.S. PATENT DOCUMENTS

| | | | |
|---|---|---|---|
| 2022/0290342 A1* | 9/2022 | Hainsworth | D03D 15/533 |
| 2024/0068165 A1* | 2/2024 | Sakai | D21F 7/08 |

\* cited by examiner

FLEXIBLE, ARC RESISTANT, FLUID REPELLANT, HIGH TEMPERATURE AND ABRASION RESISTANT, CIRCUMFERENTIALLY CONTINUOUS, SEAMLESS TEXTILE SLEEVE AND METHOD OF CONSTRUCTION THEREOF

BACKGROUND OF THE INVENTION

1. Technical Field

This invention relates generally to textile sleeves for protecting elongate members, and more particularly to flexible, circumferentially continuous, seamless textile sleeves having arc resistant, abrasion resistant, heat resistant and fluid repellent properties.

2. Related Art

It is known to contain and protect elongate members, such as wires and wire harnesses, for example, in circumferentially continuous, tubular textile sleeves to provide protection to the cables, wires, and hoses. However, these sleeves typically have multiple layers, with each of the layers being specifically provided for a different type of protection. Although the aforementioned multilayer sleeves may provide suitable protection against various environmental conditions, unfortunately they are bulky, having a thick, multilayered wall with different types of yarns being provided in each layer, thereby requiring an increased volume of space, and further, they tend to be relatively heavy and exhibit low flexibility. Further yet, having to include multiple layers can prove problematic in some applications, particularly applications requiring routing cables, wires or hoses through tight, winding areas, as well as applications having weight restrictions, such as aircraft and aerospace applications, for example.

SUMMARY OF THE INVENTION

One aspect of the invention provides a textile sleeve for routing and protecting an elongate member. The textile sleeve includes a circumferentially continuous, seamless wall. The circumferentially continuous, seamless s wall includes a textile layer having an outer surface and an opposite inner surface bounding an enclosed cavity extending lengthwise along a central longitudinal axis between opposite open ends. The textile layer is formed of yarns interlaced with one another, wherein at least some of the yarns include multifilaments resistant to heat and monofilaments resistant to heat, and a silicone-based coating adhered to the outer surface of the textile layer.

In accordance with another aspect of the invention, the yarns can including warp yarns extending generally parallel to the central longitudinal axis and weft yarns extending generally transversely to the central longitudinal axis, with the warp yarns being woven with the weft yarns.

In accordance with another aspect of the invention, the warp yarns can be provided entirely from multifilaments resistant to heat and the weft yarns can be provided including monofilaments resistant to heat.

In accordance with another aspect of the invention, the weft yarns can be provided including monofilaments resistant to heat and multifilaments resistant to heat.

In accordance with another aspect of the invention, the multifilaments resistant to heat can be provided as meta-aramid.

In accordance with another aspect of the invention, the warp multifilaments resistant to heat can be provided having a denier between about 100-3000 and the weft multifilaments resistant to heat can be provided having a denier between about 50-1000.

In accordance with another aspect of the invention, the monofilaments resistant to heat can be provided having a diameter between about 0.1-0.5 mm.

In accordance with another aspect of the invention, the monofilaments resistant to heat can be provided as PEEK.

In accordance with another aspect of the invention, the silicone-based coating can include at least one, or both of a flame retardant and a heat stabilizer.

In accordance with another aspect of the invention, the silicone-based coating has a thickness between about 0.1-3.0 mm.

In accordance with another aspect of the invention, the textile layer is circumferentially continuous and seamless.

In accordance with another aspect of the invention, the textile layer has opposite edges extending lengthwise between the opposite open ends, with the opposite edges being in overlapped relation with one another, with a seam formed between the overlapped edges, wherein the silicone-based coating is circumferentially continuous and seamless to close off the seam between the overlapped opposite edges.

In accordance with another aspect of the invention, a method of constructing a wrappable sleeve for routing and protecting an elongate member from arcing, exposure to abrasion, thermal conditions including high heat and fire, fluid (water/fuel) ingress, and other environmental conditions, such as contamination, and to protect against fluid absorption into a wall of the wrappable sleeve, is provided. The method includes interlacing heat-resistant yarn to form a textile layer having an outer surface and an inner surface bounding a cavity extending lengthwise along a central longitudinal axis between opposite open ends. Further, bonding a silicone-based coating on an outer surface of the textile layer such that the silicone-based coating is circumferentially continuous and seamless along the length of the textile layer.

In accordance with another aspect of the invention, the method can further include interlacing the yarns with one another in a weaving process, a knitting process, or a braiding process. If woven, the method can further include weaving the yarns including warp yarns extending generally parallel to the central longitudinal axis, with the warp yarns being provided entirely as multifilaments resistant to heat, and weft yarns extending generally transversely to the warp yarns, with the weft yarns including monofilaments resistant to heat.

In accordance with another aspect of the invention, the method can further include providing the weft yarns including both monofilaments and multifilaments resistant to heat.

In accordance with another aspect of the invention, the method can further include providing the warp multifilaments having a denier between about 100-3000 and providing the weft multifilaments having a denier between about 50-1000.

In accordance with another aspect of the invention, the method can further include providing the weft monofilaments having a diameter between about 0.1-0.5 mm.

In accordance with another aspect of the invention, the method can further include weaving the warp yarns and the weft yarns in one of a plain, twill, basket, or satin weave pattern.

In accordance with another aspect of the invention, the method can further include weaving the weft monofilaments and multifilaments in alternating relation with one another along the entirety of the length of the wall.

In accordance with another aspect of the invention, the method can further include providing the silicone-based coating having a thickness between about 0.1-3.0 mm.

In accordance with another aspect of the invention, the method can further include providing the silicone-based coating including at least one of a flame retardant and a heat stabilizer.

In accordance with another aspect of the invention, the method can further include forming the textile layer as a circumferentially continuous and seamless layer.

In accordance with another aspect of the invention, the method can further include forming the textile layer having opposite edges extending lengthwise between the opposite open ends, and wrapping the opposite edges being in overlapped relation with one another.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1A:
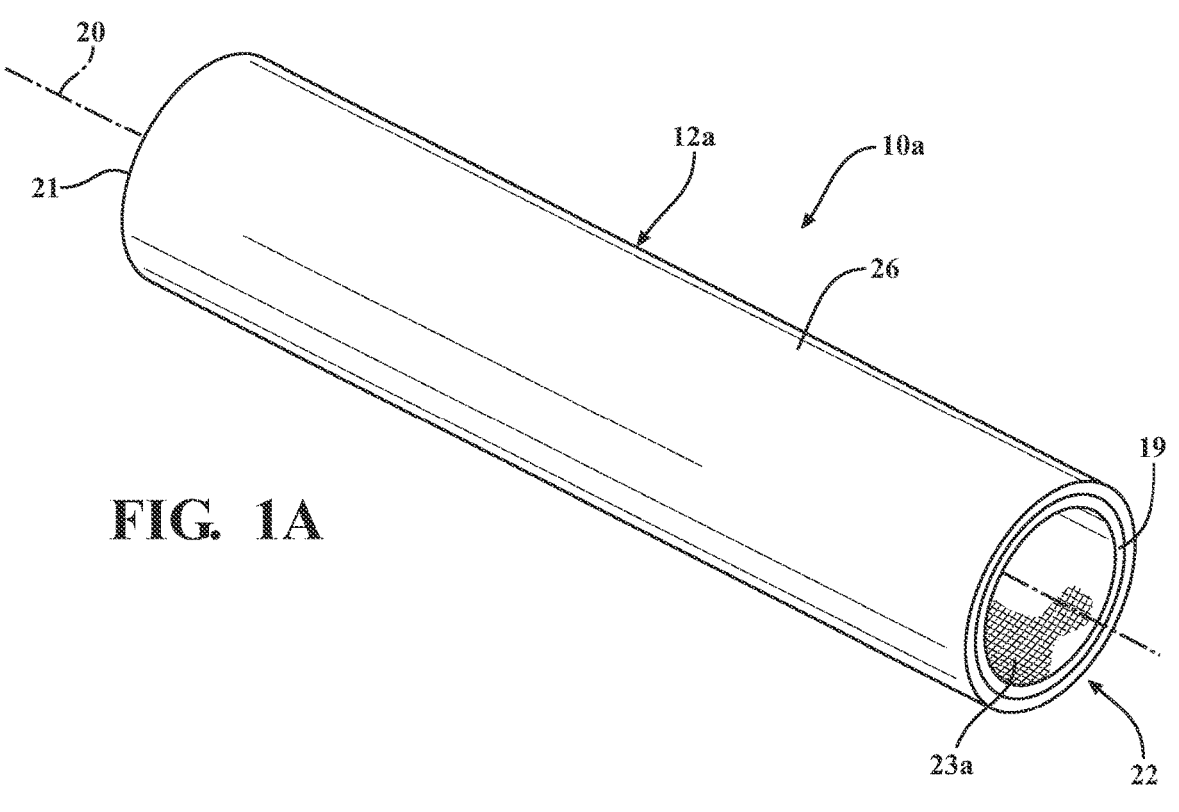
FIG. 1A is schematic perspective view of a textile sleeve constructed in accordance with one aspect of the invention, with the textile sleeve shown disposed about an elongate member to be protected therein.
Figure 1B:
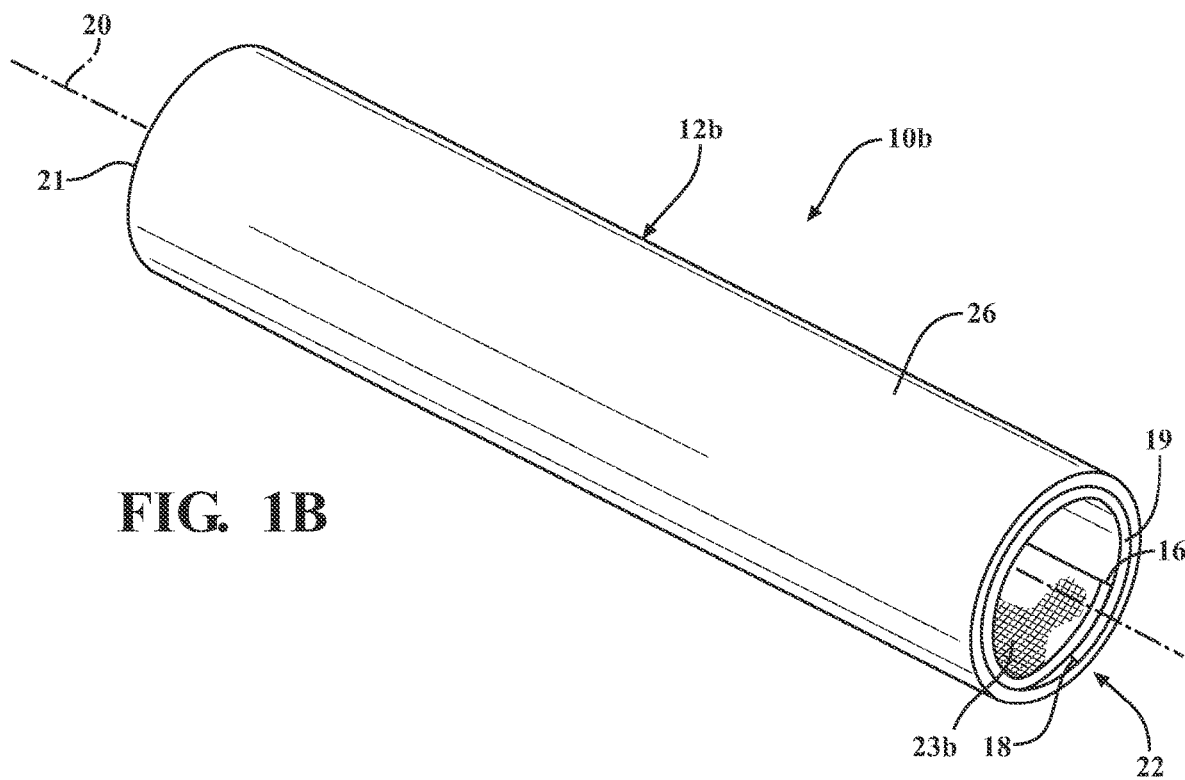
FIG. 1B is schematic perspective view of a textile sleeve constructed in accordance with another aspect of the invention, with the textile sleeve shown disposed about an elongate member to be protected therein.
Figure 2A:
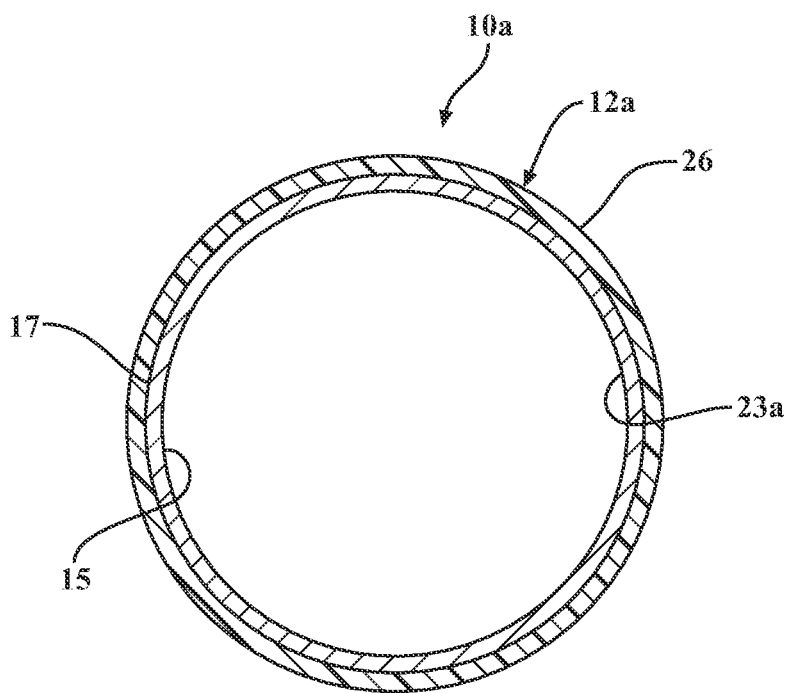
FIG. 2A is an end view looking along a central longitudinal axis of the sleeve of FIG. 1A.
Figure 2B:
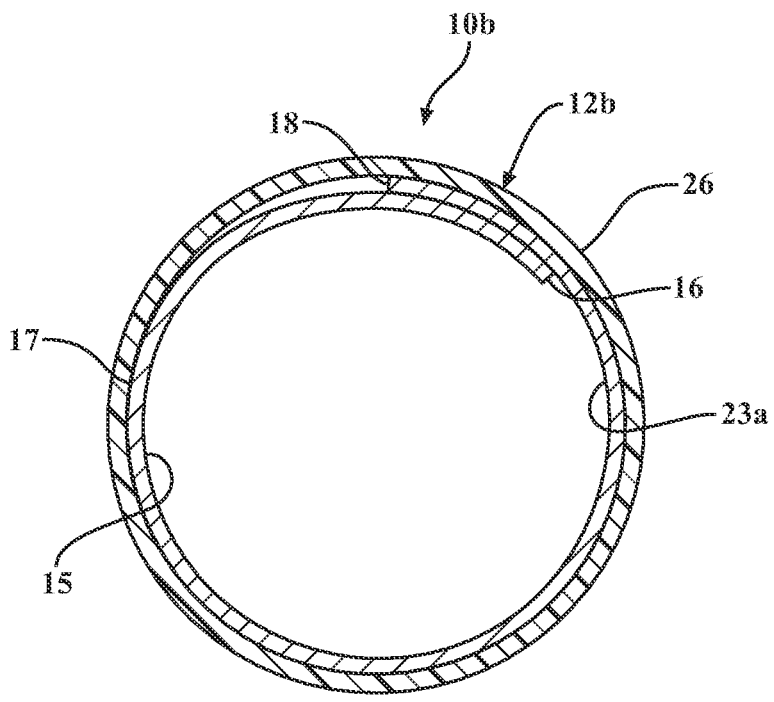
FIG. 2B is an end view looking along a central longitudinal axis of the sleeve of FIG. 1B.

Referring in more detail to the drawings, FIGS. 1A-1B and 2A-2B show a schematic representation of a circumferentially continuous, seamless textile sleeve, referred to hereafter as sleeve 10a, 10b, respectively, constructed in accordance with different aspects of the invention. The sleeve 10a, 10b has a flexible, circumferentially continuous, seamless elongate wall 12a, 12b, respectively, for routing and protecting an elongate member(s) 14, such as a cable, wires, and pipe, for example, from exposure to arcing (electrical flow path through an air gap from a cable or wire to another conductor, such that energy of a cable or wire is contained inside the wall 12a, 12b, thereby preventing the release of energy from the sleeve 10a, 10b), abrasion, thermal conditions including high heat and fire, fluid absorption and ingress, e.g. water, oil, fuel, and the like, and other environmental conditions, such as contamination. The wall 12a, 12b can be constructed having any suitable size, including length and diameter. The wall 12a, 12b has an inner surface 15 and an opposite outer surface 17. The wall 12a, 12b has an inner, interlaced textile layer 23a, 23b, respectively, formed of yarns 24 interlaced with one another in one of a woven (FIG. 3A), knit (FIG. 3B), or braided (FIG. 3C) fashion, wherein a least some of the yarns 24 include multifilaments 24a resistant to heat, and monofilaments 24b resistant to heat, thereby allowing the sleeve 10a, 10b to withstand exposure to high heat and fire for a predetermined amount of time, including up to about 2 hours or more, while protecting the elongate member 14 against heat damage. A silicone-based coating 26 is adhered to the outer surface 17 of the interlaced textile layer 23a, 23b, shown as being adhered to the entirety of the outer surface 17, thereby forming a circumferentially continuous, seamless silicone-based coating 17 about the interlaced textile layer 23a, 23b. As such, the silicone-based coating 26 enhances the aforementioned levels of protection to the elongate member 14, particularly with regard to the prevention of arc and fluid absorption/ingress. The interlaced textile layer 23a is formed as a circumferentially continuous, seamless layer, while the interlaced textile layer 23b has opposite edges 16, 18 extending lengthwise between opposite open ends 19, 21. The opposite edges 16, 18 are wrapped in overlapped relation with one another with a seam formed between the overlapped edges 16, 18. With silicone-based coating 26 being circumferentially continuous and seamless, it closes off the seam between the overlapped opposite edges 16, 18, thereby rendering the wall 12b circumferentially continuous and seamless.

The silicone-based coating 26 is a fluid impervious coating, thereby being impervious to water, fuel (e.g. kerosene), oil, and the like, to render the wall 12a, 12b fluid impervious as well as fluid repellant. As such, fluid is prevented from being absorbed by the interlaced layer 23a, 23b, thus, preventing water, fuel and the like from compromising the ability of the sleeve 10a, 10b to provide the desired levels of protection. The silicone-based coating 26 can include at least one or both of a flame retardant and a heat stabilizer, and can be provided having a thickness between about 0.1-3.0 mm, thereby contributing to the wall 12a, 12b having a narrow profile, thereby enhancing the flexibility and ability to be routed in relatively small, tight spaces.

Figures 3A, 3B, 3C:
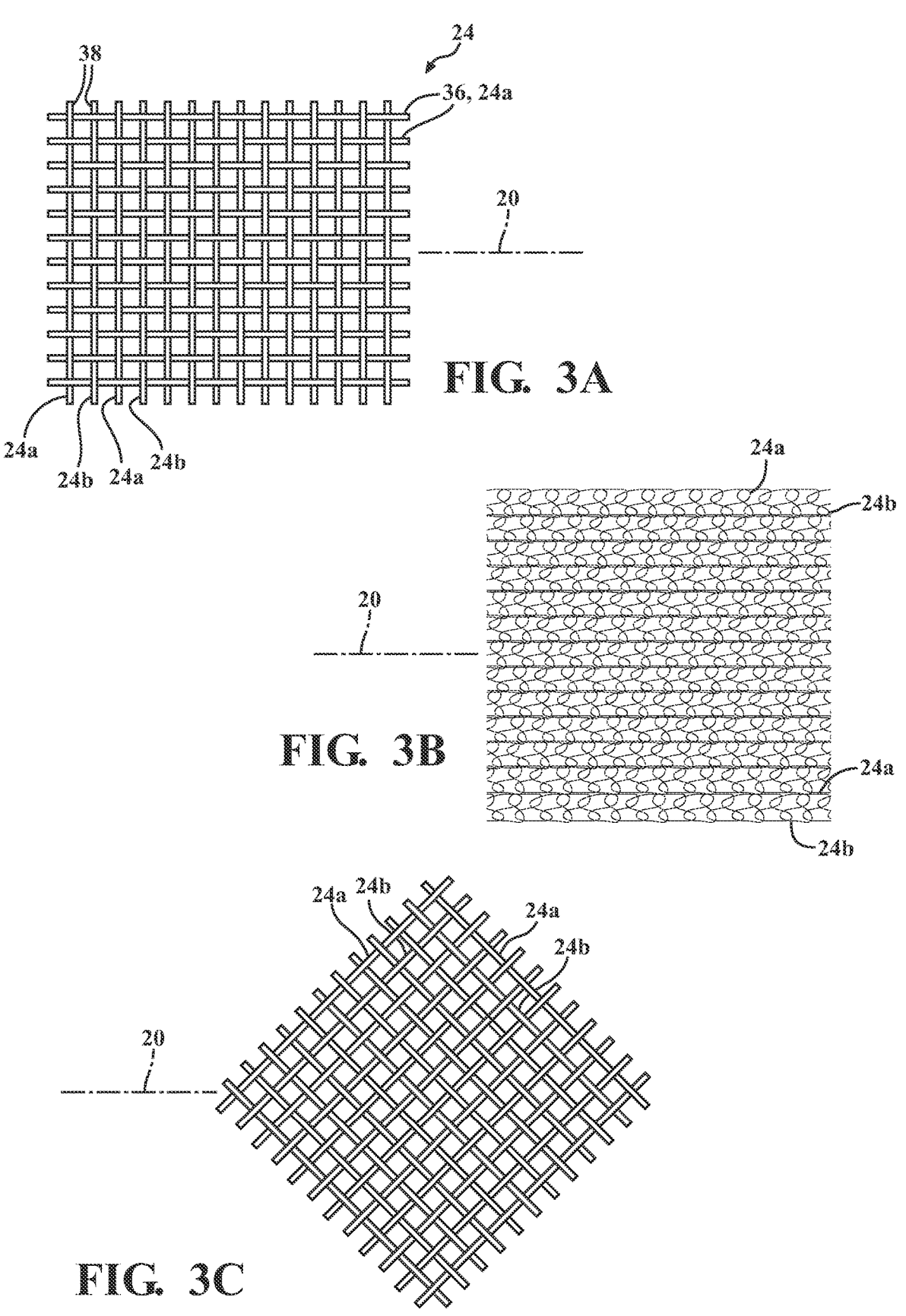
FIGS. 3A-3C illustrate different embodiments of a textile layer of the wrappable sleeves of FIGS. 1A and 1B.

The interlaced yarns 24, in a preferred embodiment of FIG. 3A, are woven, including warp yarns 36 extending generally parallel to the central longitudinal axis 20 and weft yarns 38 extending generally transversely to the central longitudinal axis 20. The warp yarns 36 can be woven with the weft yarns 38 in any desired weave pattern, including a pain weave, twill weave, satin weave or basket weave, for example, with the plain weave pattern being preferred to provide a smooth, stable and uniform protection pattern, with the smoothness facilitating bonding of the silicone-base coating 26 to the outer surface 17. The warp yarns 36 can be provided entirely from the multifilaments 24a, with the multifilaments 24a being resistant to heat (high temperature resistant) and the weft yarns can be provided including the monofilaments 24b, with the monofilaments 24b also being resistant to heat (high temperature resistant), while also having high abrasion resistance. Further yet, if desired to provide the wall 12b as being self-wrapping, the monofilaments 24b can be provided as being heat-settable, thereby be able to be heat-set to impart a heat-formed bias in the wall 12 to maintain the opposite edges 16, 18 in overlapping relation with one another, absent an externally applied force sufficient to overcome the internal bias. Of course, the silicone-based coating 26 acts to seal and close off the seam formed between the opposite edges 16, 18, thereby providing the sleeve 10a as being circumferentially continuous and seamless along its length. The weft yarns 38 can further include the multifilaments 24a being resistant to heat, with the weft monofilaments 24b and weft multifilaments 24a being provided in any desired ratio, and in one presently preferred embodiment, the weft monofilaments 24*b* and weft multifilaments 24*a* can be woven in alternating relation with one another in a 1:1 ratio.

The warp multifilaments 36, 24*a* can be provided as meta-aramid having a denier between about 100-3000 tex, and the weft multifilaments 38, 24*a* can be provided having a denier between about 50-1000 tex. The weft monofilaments 38, 24*b* can be provided as PEEK having a diameter between about 0.1-0.5 mm. With the weft multifilaments 38, 24*a* having a reduced effective diameter than the warp multifilaments 36, 24*a*, an increased weave tightness and density can be achieved to provide enhance protection to the elongate member 14.

In accordance with another aspect of the disclosure, with reference to FIGS. 3B and 3C, the textile layer 23*a*, 23*b* can be knitted or braided with the aforementioned multifilaments 24*a* and monofilaments 24*b*. It is to be recognized that any desired combination of the multifilaments 24*a* and/or monofilaments 24*b* can be used to form the knitted or braided interlaced yarns 24.

In accordance with another aspect of the invention, a method of constructing a textile sleeve 10*a*, 10*b* is provided. The method includes interlacing heat-resistant yarn 24 to form a textile layer 12*a*, 12*b* having an outer surface 17 and an inner surface 15 bounding a cavity 22 extending lengthwise along a central longitudinal axis 20 between opposite open ends 19, 21. Further, bonding a silicone-based coating 26 on the outer surface 17 of the textile layer 12*a*, 12*b* such that the silicone-based coating 26 is circumferentially continuous and seamless along the length of the textile layer 12*a*, 12*b*.

The method can further include interlacing the yarns 24 with one another in a weaving process, a knitting process, or a braiding process. If woven, the method can further include weaving the yarns including warp yarns 36 extending generally parallel to the central longitudinal axis 20, with the warp yarns 36 being provided entirely as multifilaments 24*a* resistant to heat, and weft yarns 38 extending generally transversely to the warp yarns 36, with the weft yarns 38 including monofilaments 24*b* resistant to heat.

In accordance with another aspect, the weft yarns 38 can further include monofilaments 24*b* and multifilaments 24*a* resistant to heat.

The method can further include providing the warp multifilaments 36, 24*a* having a denier between about 100-3000 tex and providing the weft multifilaments 38, 24*a* having a denier between about 50-1000 tex.

The method can further include providing the weft monofilaments 24*b* having a diameter between about 0.1-0.5 mm.

Further yet, the method can include weaving the warp yarns 36 and the weft yarns 38 in one of a plain, twill, basket, or satin weave pattern.

The method can further include weaving the weft monofilaments 24*b* and weft multifilaments 24*a* in alternating relation with one another along the entirety of the length of the wall 12, such that the monofilaments 24*b* and weft multifilaments 24*a* are provided in a 1:1 ratio.

The method can further include providing the silicone-based coating 26 having a thickness between about 0.1-3.0 mm, and in one exemplary embodiment, a thickness between about 0.1-1.00 mm.

The method can further include providing the silicone-based coating 26 including at least one of a flame retardant and a heat stabilizer, thereby allowing the sleeve to withstand exposure to high heat and fire for a predetermined amount of time, including up to about 2 hours, while protecting the elongate member therein against damage.

The method can further include forming the textile layer 12*a* as a circumferentially continuous and seamless layer.

The method can further include forming the textile layer 12*b* having opposite edges 16, 18 extending lengthwise between the opposite open ends 19, 21, and wrapping the opposite edges 16, 18 being in overlapped relation with one another.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting an elongate member, comprising:
   a seamless, circumferentially continuous wall, said circumferentially continuous wall including a textile layer having an outer surface and an opposite inner surface bounding an enclosed cavity extending lengthwise along a central longitudinal axis between opposite open ends, said textile layer being formed of yarns interlaced with one another, wherein at least some of said yarns include multifilaments resistant to heat and monofilaments resistant to heat, and a silicone-based coating adhered to said outer surface of said textile layer,
   wherein said yarns include warp yarns extending generally parallel to said central longitudinal axis and weft yarns extending generally transversely to said central longitudinal axis, said warp yarns being woven with said weft yarns,
   wherein said warp yarns are provided entirely from said multifilaments resistant to heat and said weft yarns are provided including said monofilaments resistant to heat.

2. The textile sleeve of claim 1, wherein said weft yarns are provided including said multifilaments resistant to heat.

3. The textile sleeve of claim 2, wherein said multifilaments resistant to heat are provided as meta-aramid.

4. The textile sleeve of claim 2, wherein said warp multifilaments resistant to heat are provided having a denier between about 100-3000 dtex and said weft multifilaments resistant to heat are provided having a denier between about 50-1000 dtex.

5. The textile sleeve of claim 4, wherein said monofilaments resistant to heat are provided having a diameter between about 0.1-0.5 mm.

6. The textile sleeve of claim 3, wherein said monofilaments resistant to heat are provided as PEEK.

7. The textile sleeve of claim 1, wherein said silicone-based coating includes at least one of a flame retardant and a heat stabilizer.

8. The textile sleeve of claim 1, wherein said silicone-based coating has a thickness between about 0.1-3.0 mm.

9. The textile sleeve of claim 1, wherein said textile layer is circumferentially continuous and seamless.

10. The textile sleeve of claim 1, wherein said textile layer has opposite edges extending lengthwise between said opposite open ends, said opposite edges being in overlapped relation with one another with a seam formed between said overlapped edges, wherein said silicone-based coating is circumferentially continuous and seamless to close off said seam between said overlapped opposite edges.

11. A textile sleeve for routing and protecting an elongate member, comprising:

a seamless, circumferentially continuous wall, said circumferentially continuous wall including a textile layer having an outer surface and an opposite inner surface bounding an enclosed cavity extending lengthwise along a central longitudinal axis between opposite open ends, said textile layer being formed of yarns interlaced with one another, wherein at least some of said yarns include multifilaments resistant to heat and monofilaments resistant to heat, and a silicone-based coating adhered to said outer surface of said textile layer, wherein said multifilaments resistant to heat are provided as meta-aramid, wherein said yarns include warp yarns extending generally parallel to said central longitudinal axis and weft yarns extending generally transversely to said central longitudinal axis, said warp yarns being woven with said weft yarns, and wherein said warp yarns include said multifilaments resistant to heat provided having a denier between about 100-3000 dtex and said weft yarns include said multifilaments resistant to heat provided having a denier between about 50-1000 dtex.

12. The textile sleeve of claim 11, wherein said weft yarns include said monofilaments resistant to heat provided having a diameter between about 0.1-0.5 mm.

13. A textile sleeve for routing and protecting an elongate member, comprising:

a seamless, circumferentially continuous wall, said circumferentially continuous wall including a textile layer having an outer surface and an opposite inner surface bounding an enclosed cavity extending lengthwise along a central longitudinal axis between opposite open ends, said textile layer being formed of yarns interlaced with one another, wherein at least some of said yarns include multifilaments resistant to heat and monofilaments resistant to heat, and a silicone-based coating adhered to said outer surface of said textile layer, wherein said yarns include warp yarns extending generally parallel to said central longitudinal axis and weft yarns extending generally transversely to said central longitudinal axis, said warp yarns being woven with said weft yarns, wherein said warp yarns include said multifilaments resistant to heat provided having a denier between about 100-3000 dtex and said weft yarns include said multifilaments resistant to heat provided having a denier between about 50-1000 dtex.

14. The textile sleeve of claim 13, wherein said monofilaments resistant to heat are provided having a diameter between about 0.1-0.5 mm.

* * * * *